(12) United States Patent
Venkatraman

(10) Patent No.: US 9,372,501 B2
(45) Date of Patent: Jun. 21, 2016

(54) BLOCK ALIGNER-BASED DEAD CYCLE DESKEW METHOD AND APPARATUS

(75) Inventor: Shrinivas Venkatraman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 13/977,500

(22) PCT Filed: Dec. 22, 2011

(86) PCT No.: PCT/US2011/066915
§ 371 (c)(1),
(2), (4) Date: Jun. 28, 2013

(87) PCT Pub. No.: WO2013/095526
PCT Pub. Date: Jun. 27, 2013

(65) Prior Publication Data
US 2013/0283085 A1 Oct. 24, 2013

(51) Int. Cl.
*G06F 1/10* (2006.01)
*G06K 5/04* (2006.01)
*G06F 13/00* (2006.01)

(52) U.S. Cl.
CPC ........ *G06F 1/10* (2013.01); *G06F 13/00* (2013.01); *G06K 5/04* (2013.01)

(58) Field of Classification Search
CPC .............. G06F 1/10; G06F 13/00; G06K 5/04
See application file for complete search history.

(56) References Cited

U.S. PATENT DOCUMENTS

| 7,178,075 | B2* | 2/2007 | Warnock ........ G01R 31/318594 714/731 |
| 7,480,357 | B2* | 1/2009 | Adkisson .................. G06F 5/06 370/324 |
| 7,623,482 | B2* | 11/2009 | Adkisson .................. G06F 1/12 370/324 |
| 7,664,146 | B1 | 2/2010 | Reches |
| 7,761,669 | B2* | 7/2010 | Allison ............... G06F 13/1642 710/6 |
| 2004/0071250 | A1 | 4/2004 | Bunton et al. |
| 2005/0286565 | A1 | 12/2005 | Vakil et al. |
| 2008/0279224 | A1 | 11/2008 | Pontius |
| 2009/0019239 | A1* | 1/2009 | Allison ............... G06F 13/1642 711/151 |
| 2009/0276558 | A1 | 11/2009 | Goma et al. |
| 2011/0182384 | A1 | 7/2011 | Watsuki et al. |

OTHER PUBLICATIONS

PCT Search Report, PCT/US2011/066915, Intel Corporation, Apr. 19, 2012, 8 pages.

* cited by examiner

*Primary Examiner* — M Elamin
(74) *Attorney, Agent, or Firm* — Blakely, Sokoloff, Taylor & Zafman LLP

(57) ABSTRACT

A method and apparatus to deskew dead cycles is described using a block aligner. In one example a method includes receiving a sequence of bytes into a first buffer from each lane of a multiple lane peripheral device bus and receiving the sequence of bytes into a second buffer delayed one clock cycle from the first buffer. The method further includes providing the sequence of bytes from the first buffer to an output buffer, counting clock cycles of data as the data is received into the first and second buffers, upon reaching a predetermined count, inserting a dead cycle into the output buffer, and after inserting the dead cycle providing the sequence of bytes from the second buffer instead of the first buffer to the output buffer.

20 Claims, 7 Drawing Sheets

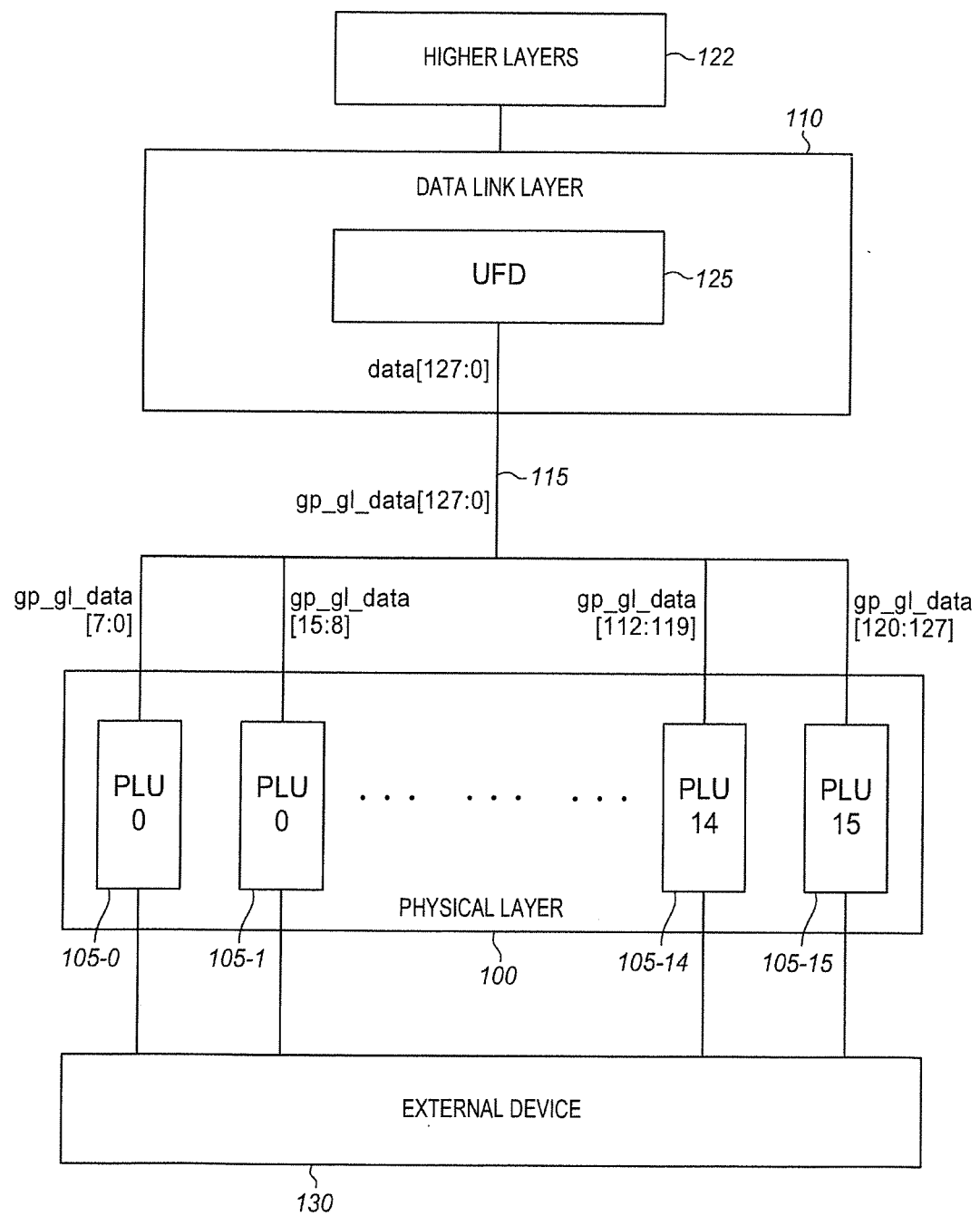

BLOCK ALIGNER-BASED DEAD CYCLE DESKEW METHOD AND APPARATUS

CROSS-REFERENCE TO RELATED APPLICATION

This patent application is a U.S. National Phase Application under 35 U.S.C. §371 of International Application No. PCT/US2011/066915, filed Dec. 22, 2011, entitled "BLOCK ALIGNER-BASED DEAD CYCLE DESKEW METHOD AND APPARATUS".

TECHNICAL FIELD

The present description relates to receiving data across multiple lanes and in particular to deskewing such data using dead cycles.

BACKGROUND

The specification for the PCIe Gen3 (Peripheral Component Interconnect Express, third generation starting with version 3.0) protocol introduces 128-to-130 bit encoding. A serial stream has a 2-bit sync-header followed by a 128 bit payload known as blocks. The sync header can be either 01 or 10 in binary indicating a PCIe receiver whether the following 128-bits are a data block or an ordered set block. Ordered set blocks facilitate link training and help set the link up in order to process the data blocks. The 128 bit payload are in the form of 8 bit symbols which can be easily processed by the link and transaction layers of the PCIE receiver. However the 2 bit sync headers cannot be processed easily by the link and transactional layers so they are removed before the receiver's link layer processes incoming data blocks, the sync headers are removed.

However, removal of these 2 bit sync headers every 16 cycles of e.g. a 1 GHz clock, creates an underflow condition in the upstream data which can only be corrected by inserting an upstream dead cycle (a cycle with no data) after every 64 cycles of the 1 GHz clock of data. The dead cycles can occur at different times in each lane of a PCIe interface depending on the physical channel lengths of the PCIE lanes. The injection of dead-cycles into data transfers over the bus has the effect of causing latency in each lane of a multiple lane PCIe link. However, different lanes of the PCIe link have different amounts of latency. As a result, dead-cycle behavior is different across different lanes and this causes indeterminism.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a block diagram of hardware layers of a high speed data communications bus having a physical lane unit for use according to an embodiment of the invention.

DETAILED DESCRIPTION

Figure 2A:
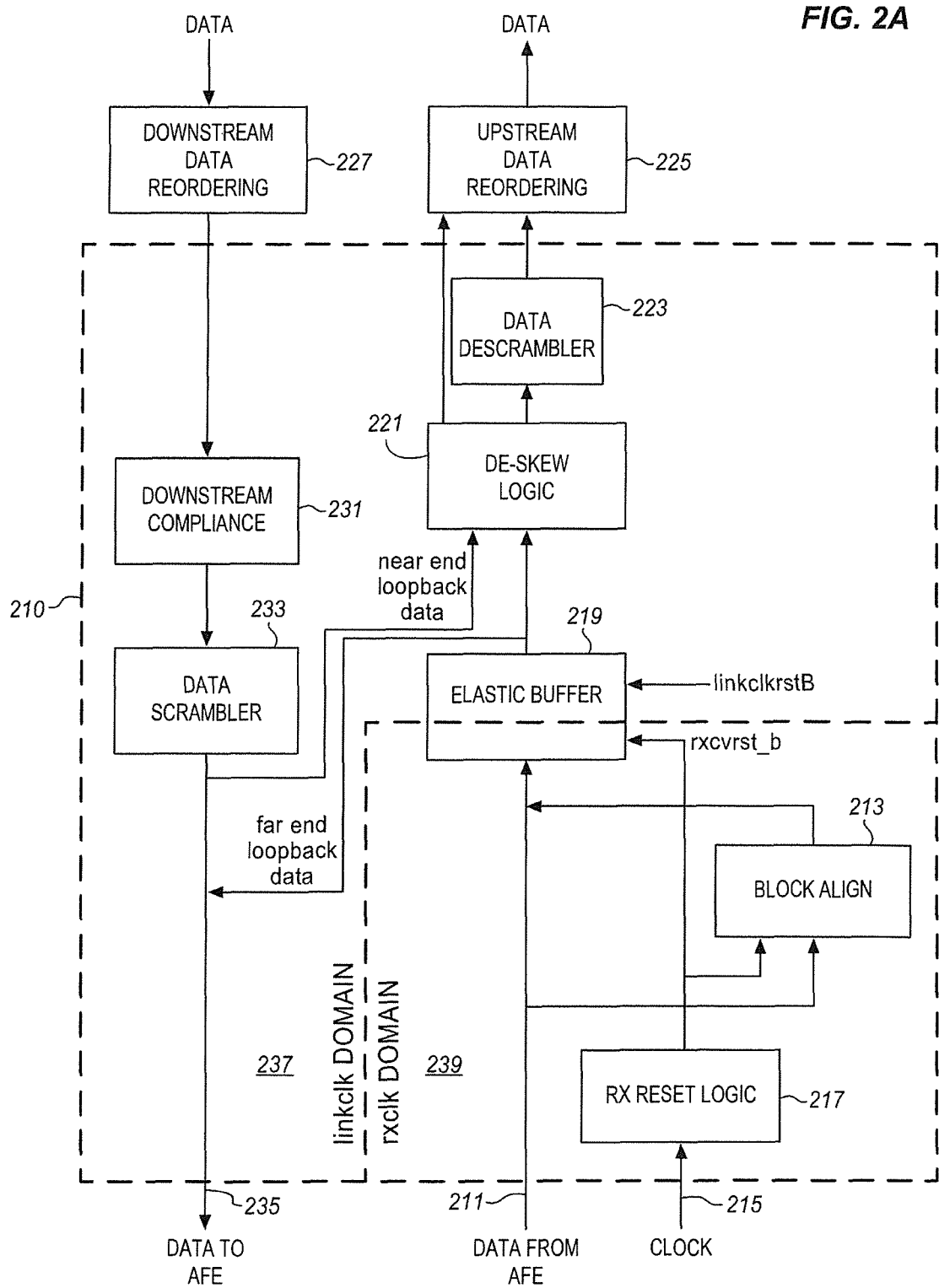
FIG. 2A is a block diagram of a portion of a physical lane unit having a block aligner according to an embodiment of the invention.

Embodiments of the present invention provide a cost effective way to eliminate the indeterminism associated with dead-cycles and to align the timing across all lanes of a multiple lane data bus. In one example, an additional set of delay elements along with a 2 bit timer are used in a block aligner.

Traditional alignment mechanisms use a deskew buffer to eliminate skew or misalignment between different PCIE lanes. The deskew buffer is an expensive FIFO (First In First Out) buffer with considerable complex supporting logic to address this issue. A deskew buffer can be expensive in terms of silicon area and power consumption and can also be vulnerable to corner case scenarios introduced by the PCIe 3.0 spec especially when link signal integrity is less than perfect.

In the described embodiments, dead-cycles are forced across all of the lanes simultaneously, eliminating the additional skew due to dead cycle. A two bit counter overflows after every 4 blocks of data to mark the cycle at which a dead cycle is forced on all of the lanes simultaneously. A duplicate set of the input data banks which are one symbol clock cycle delayed relative to the regular data banks provide the one cycle buffer needed to accommodate an overflow. The overflow can occur because the forced dead-cycles (external dead cycles) may not be aligned with the actual dead cycles (internal dead cycle) inserted into the data. For a PCIe Gen3 implementation, the reception Start of Data Stream Ordered Set (SDSOS), that is defined in the specification, can be used as a unique event to trigger the described process.

By using a block aligner, the deskew system is less vulnerable to signal integrity problems. In addition, because the described block aligner may be implemented simply, the dead cycle indeterminism can be eliminated with the addition of about approximately ten sequential logic circuits and minor supporting logic.

FIG. 1 shows a physical layer PITY 100 and a data link layer 110. Data is received on one or more of 16 physical lane units (PLU) from a PCIe interface to an external device 130. The external device may be any of a variety of different peripheral devices, such as graphics, sound, storage, and input devices. Alternatively, the interface may be to a computing device and the illustrated PHY is a part of such a peripheral device. PCIe is specified to operate with 1, 2, 4, 8, 12, 16, or 32 lanes and 16 lanes are shown, however any number of lanes may be used with the embodiments described herein. The described embodiments may also be used with other communications interfaces which may have more or fewer lanes.

The data from each physical lane is combined into a single data input stream 115 into the data link layer 110. The data link layer tracks the state of the PHY. It communicates the status of the link with higher layers 122 and manages the link through the PHY.

The data link layer 110 includes an Upstream Frame Decoder (UFD) block 125 of the data link layer, among other components (not shown). The UFD passes data to higher layers 122, such as transaction layers and application layers.

FIG. 2A is a block diagram of a portion 210 of a physical lane unit 105. Data from the external device 130 is received at the data decoder of FIG. 2A at a data port 211. The data is provided to a block aligner 213. A clock 215 is applied to receive or reset logic 217 and also is applied to the block aligner 213. Data from the block aligner is then applied into an elastic buffer 219 which includes a clock reset input. From the elastic buffer the data may be applied to de-skew logic 221 and to a data descrambler 223 and from there up to upstream data reordering 225. The reordered data is then supplied to other parts of the physical layer or to higher layers such as a data link layer.

For the opposite direction, data from the higher layers is applied to downstream data reordering 227 and then to a downstream compliance block 231 to ensure that the received data is in compliance with physical standards. The data is then scrambled in a scrambler block 233 and provided out to the analog front end 235. As shown, there are two clock domains. A link clock domain 237 and a receiver clock domain 239. The received data and the reset logic are applied to the block aligner and the elastic buffer within the domain 237 of the receiver clock. The elastic buffer outputs this data in accordance with the link clock into the link clock domain 239 which includes the de-skew logic 221 and data scrambler 223. The components shown in FIG. 2A are used also in PCI GEN 1 and 2 as well as in GEN 3 devices. There may be additional components not shown to provide additional functions depending upon the supported standards and protocols for the particular implementation.

Figure 2B:
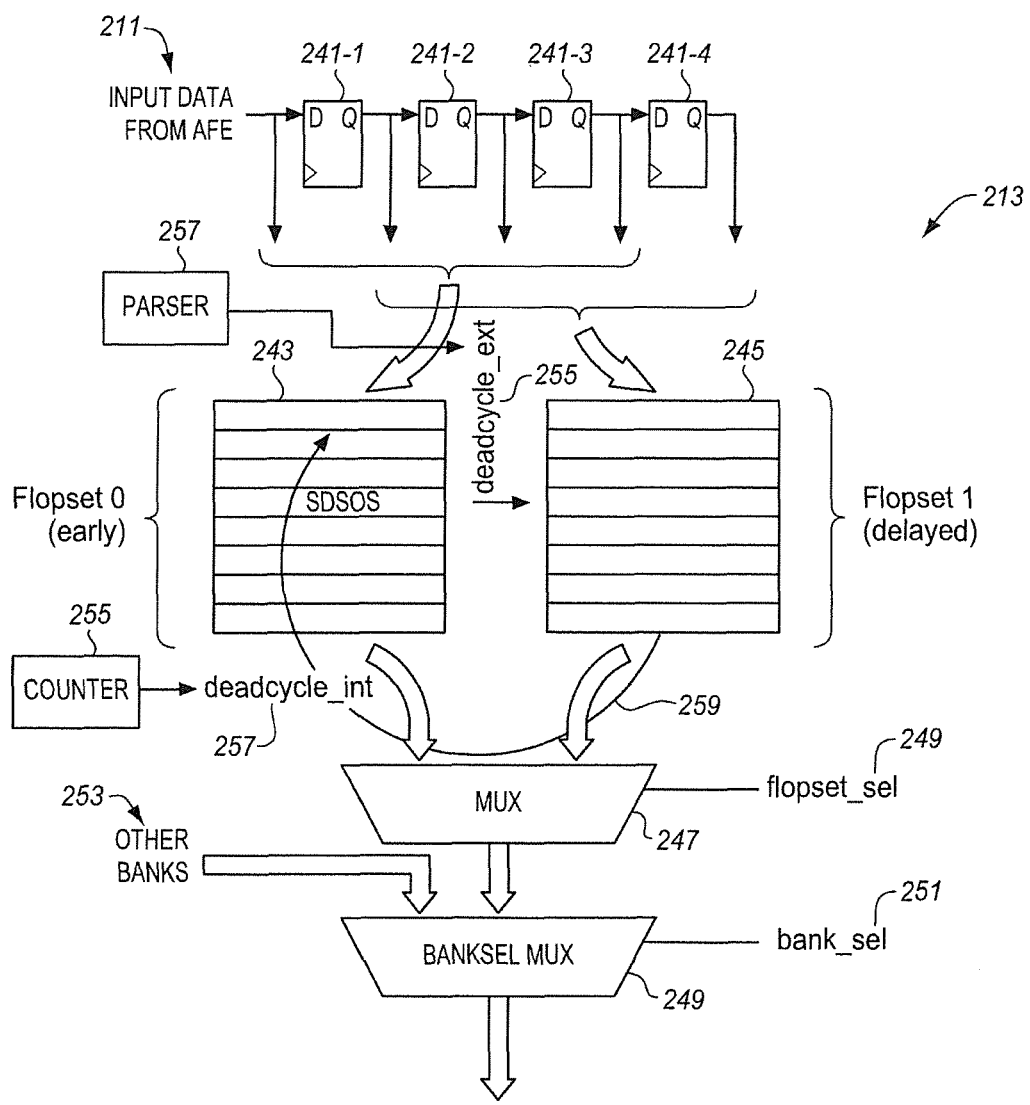
FIG. 2B is a block diagram of a block aligner according to an embodiment of the invention.

FIG. 2B shows further details of the block aligner 213 of FIG. 2A. Input data from the analog front end 211 is applied, in this case, to a sequence of D-type flip-flops 241-1 to 241-4. The input data is applied without delay directly to a first set of buffers 243 as shown. In one embodiment of the invention, the buffers are 8 banks, each 18 bits wide, capable of storing 4 clock cycles of data where there are 2 bytes per clock cycle. The output data from the D-Type flip-flops serves as a delay stage, delaying the input data from the AFE by one clock cycle, and this delayed data is applied to a second similar buffer 245. This buffer may also be 8 banks, each bank of which is 18 bits wide. However the particular size and configuration of the buffers may be adapted to suit any particular implementation.

The two buffers are each coupled to a multiplexer 247 which has a selection input 248. The selection input selects between the first buffer 243 and the second buffer 245. The output of the multiplexer is applied to a bank selection multiplexer 249 which has a bank selection input 251. Data from this particular set of buffers as well as from other banks 253 are applied to the bank selection multiplexer. The output of the bank selection multiplexor is then applied to the elastic buffer 219 shown in FIG. 2A.

In a multi-lane peripheral component interconnector bus, the structure of FIG. 2A may be repeated for each lane. The buffers shown in FIG. 2B are suitable for one lane of data in a typical 16 lane PCIe interface.

The first buffer is referred to as FLOPSET0 and the second as FLOPSET1 in the diagram. As shown, data is applied from the AFE into FLOPSET0. As shown in the illustration, at the receipt of an SDSOS (start of data stream ordered set signal) the data is supplied from FLOPSET0 into the FLOPSET mux 247. The external dead cycle 255 is inserted in the data, during the one clock cycle when the data is switched over to FLOPSET1 this is done using the FLOPSET selector 248 to switch the data supplied from the FLOPSET mux. This is indicated by the arrow showing a connection between the dead cycle external from FLOPSET0 to FLOPSET1.

The stripping of 2 bits out of every 130 bits of data causes a data underflow which has to be adjusted for by injecting a dead cycle in the upstream data leaving the blockaligner. An internal dead cycle happens whenever the blockaligner logic adjusts to this underflow condition. The dead cycles injected into the upstream data are referred to as external dead cycles. This external dead cycle injection may not exactly align to the internal dead cycles and this is resolved using the buffer flipping mechanism explained above.

The system provides for an external dead cycle to be inserted into the data whenever the 2 bit dead cycle counter 256 overflows. The FLOPSET selector switches from FLOPSET 0 to FLOPSET as it injects the dead cycle into the data stream. The internal dead cycle indicated by arrow 258 is absorbed by switching from the bottom of FLOPSET to the top of FLOPSET 0. This is done in conjunction with again switching the FLOPSET selector 248 in the FLOPSET multiplexer 247.

Using these two buffers and the multiplexer an internal dead cycle, that is a dead cycle that occurs in the input data from the AFE, can be eliminated by switching from FLOPSET0 to FLOPSET1. Similarly, an external dead cycle, that is a dead cycle that is added to the data, can be inserted and this allows the buffers to be switched from FLOPSET1 to FLOPSET0. The external dead cycle which is governed by a 2 bit dead cycle synchronized counter allows all of the lanes to be aligned simultaneously and the external dead cycle can be deleted to avoid confusing upstream equipment. The SDSOS, which acts as a unique marker allows the dead cycle counters to synchronize across all lanes.

The external dead cycle can be controlled by a counter 256 which counts cycles of data as received from the AFE. This counter can be coupled to a parser 257 which not only determines synchronization with the incoming data but can also determine when particular signals arrive that can be used to reset the counter. In one example, the SDSOS signal is used to reset the counter 256. The parser 257 is also connected to determine the occurrence of an external dead cycle 255 which is then also used to trigger the FLOPSET selection 248.

Figure 2C:
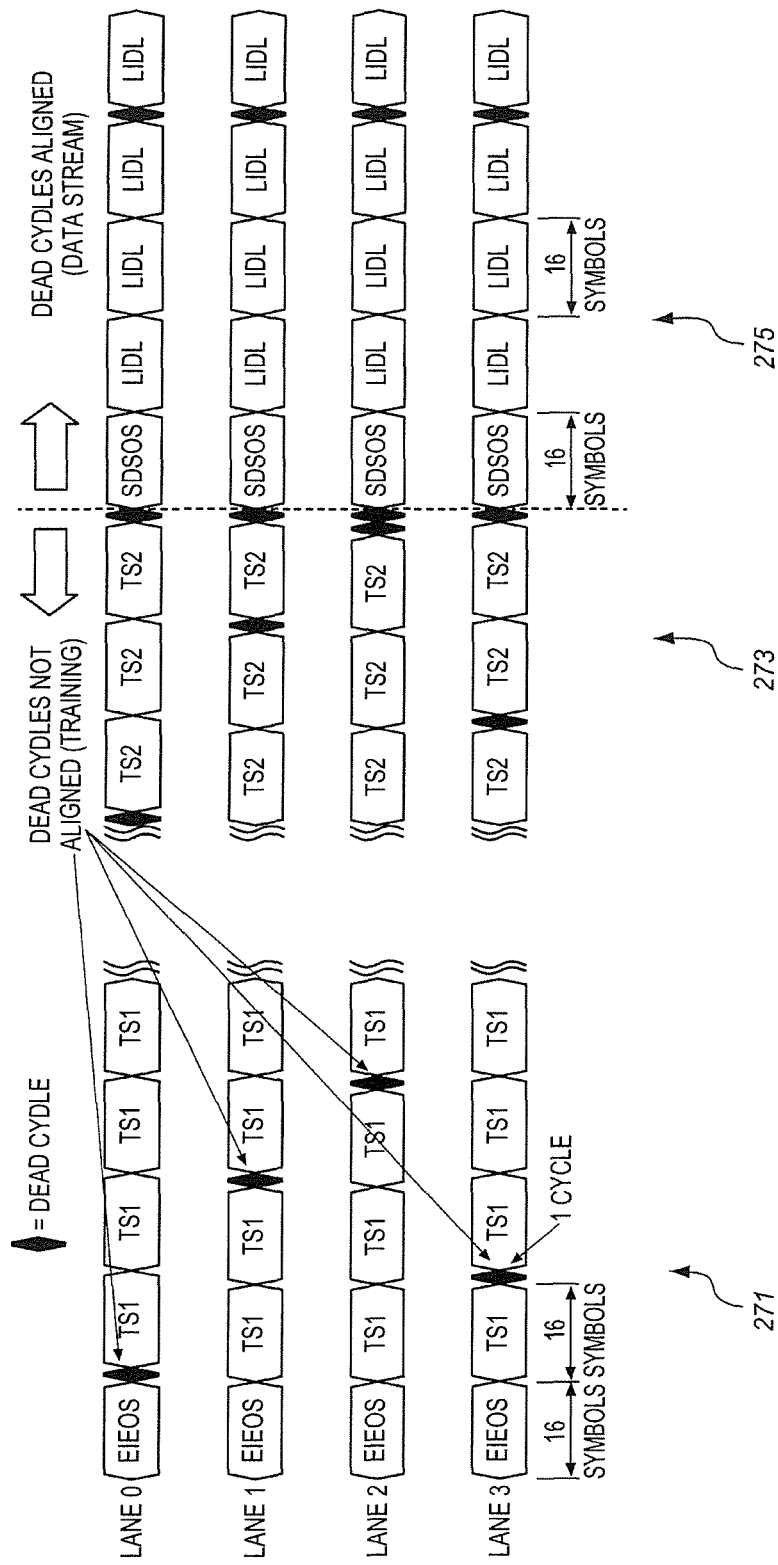
FIG. 2C is a timing diagram of aligning dead cycles across lanes of a data communications bus according to an embodiment of the invention.

FIG. 2C shows how dead cycles can be aligned simultaneously across all lanes of the multiple lane peripheral bus. FIG. 2C shows a first input training data set 271 as received over the AFE. The TS1s and TS2s comprise a 130 bit block called training sequence 1 and 2 respectively. As an illustration, each of the four lanes, lane 0 to lane 3, have dead cycles that occur at different instances across lanes. The dead cycles are not aligned during training due to differences in processing for each lane and due to differences in the physical path traversed by the data in each lane. During training the there is no attempt to align the dead cycles across lanes. The dead cycles are only aligned starting after the reception of SDSOS (Start of Data Stream Ordered Set) which is a unique pattern that marks the start of the data stream for all lanes received. It is received only once at the end of training. Upon receiving the SDSOS the 2 bit dead cycle counter is reset across all lanes. The dead cycle counters then increment on every encoded block and trigger the dead cycle as they overflow from a count of 3 back to 0. As indicated an encoded block corresponds to 16 symbols of 1 byte wide each in the illustrated example.

Figure 3:
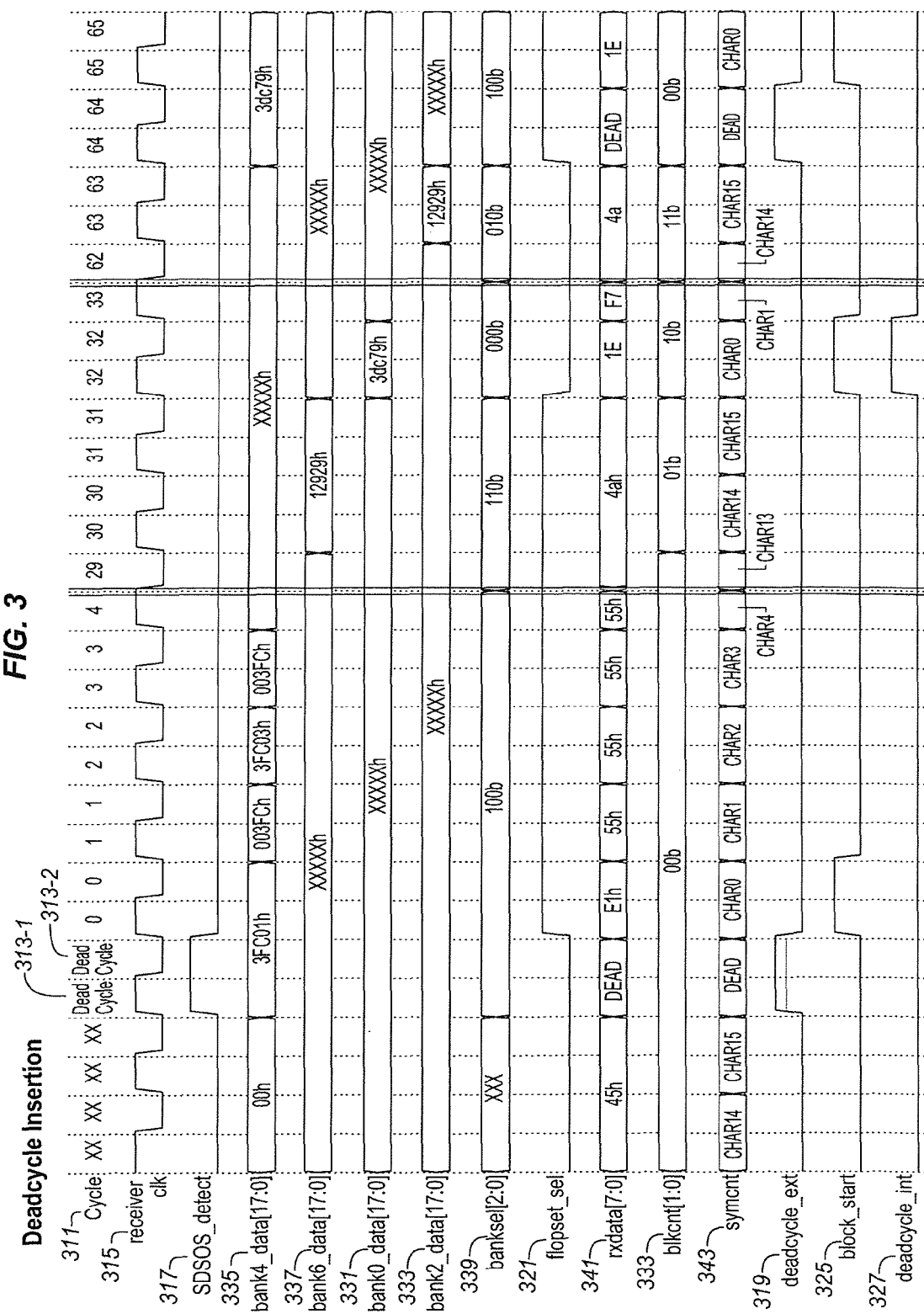
FIG. 3 is a timing diagram of removing and inserting dead cycles across lanes of a data communication bus according to an embodiment of the invention.

The per lane operation of the block aligner 213 can be seen from another perspective using the timing diagram of FIG. 3. In FIG. 3 time progresses from left to right and the status of a variety of different signals are shown as rows along the timing diagram. The cycles are numbered starting with a cycle line 311. The receiver continues to cycle and the cycles are counted as 0 through to 65. A clock cycle corresponds to an up pulse and down pulse of the receiver clock 315. The names of the output symbols for each cycle are provided in line 343.

This line counts symbols from 0 to 15 ignoring external dead cycles in the count. Dead cycles (dead cycle external 319) are inserted on the cycle when the 1$^{st}$ symbol of SDSOS (shown on line 317) is received on FLOPSET 0.

The parser can insert an external dead cycle signal when the 2 bit block counter (dead cycle counter) overflows. This is shown at 319 where a first dead cycle occurs when the 1$^{st}$ symbol of SDSOS is detected on flopset 1, immediately before clock cycle 0 corresponding to the dead cycles 313-1 and 313-2 in the cycle identification line 311. A second dead cycle is inserted by the parser (shown on line 319) and a corresponding signal has been sent at clock cycle 64. A FLOPSET selection line 321 shows that upon the insertion of an external dead cycle, the FLOPSET select at clock cycle 0 goes from FLOPSET1 to FLOPSET0. This occurs again when the next dead cycle is inserted at cycle 64.

A block counter line 323 corresponds to the counter 256 of FIG. 2B. This counter has been reset at the beginning of the SDSOS block as indicated by a block start line 325 and by the SDSOS detect line 317. Accordingly, at cycle 0 the value in the block counter is 0. This is shown as a two-digit binary 00 value. The counter then counts through and reaches a value of 3 indicated as a binary 11 at the transition of cycle 63 to cycle 64.

In this example, there is one block of data in 16 clock cycles. Accordingly 4 blocks of data corresponds to 64 cycles. The block counter counts 4 blocks so it reaches its maximum value at the 64th cycle as shown at the transition from 63 to 64. This can be achieved with a two bit counter which, as shown, counts from 00 to 01 to 10 to 11. Upon reaching 11, the counter can trigger a change in the FLOPSET selection 321 as shown at the transition from 63 to 64 and it can trigger the insertion of an external dead cycle. Line 327 shows the internal dead cycle happening at the transition in block 32.

The timing diagram of FIG. 3 also shows a line for some of the 8 banks of data. As data is received in the various lanes and provided into different banks, there is a line for bank 0 331, bank 2 333, bank 4 335, and bank 6 337. The data values shown in these lines are arbitrary and are shown simply to illustrate that data is received. In each of these banks, the bank selection signal 339 indicates how the bank selection multiplexor can be triggered to change the bank provided as the clock cycles progress.

The rxdata (received data) line 341 shows the block aligner output data that feeds into the elastic buffer. Of particular interest are the dead cycles that are shown as injected after every 64 clock cycles of data. This behavior is consistent across all PCIe lanes. The symbol counter 343 keeps track of the symbols within a block, 16 of them. It helps the block aligner identify when a new block is going to start.

Finally, a symbol counter shows a sequence of characters that are produced as strings of 16 symbols followed by dead cycles. These symbols are the output into the elastic buffer.

Figure 4:
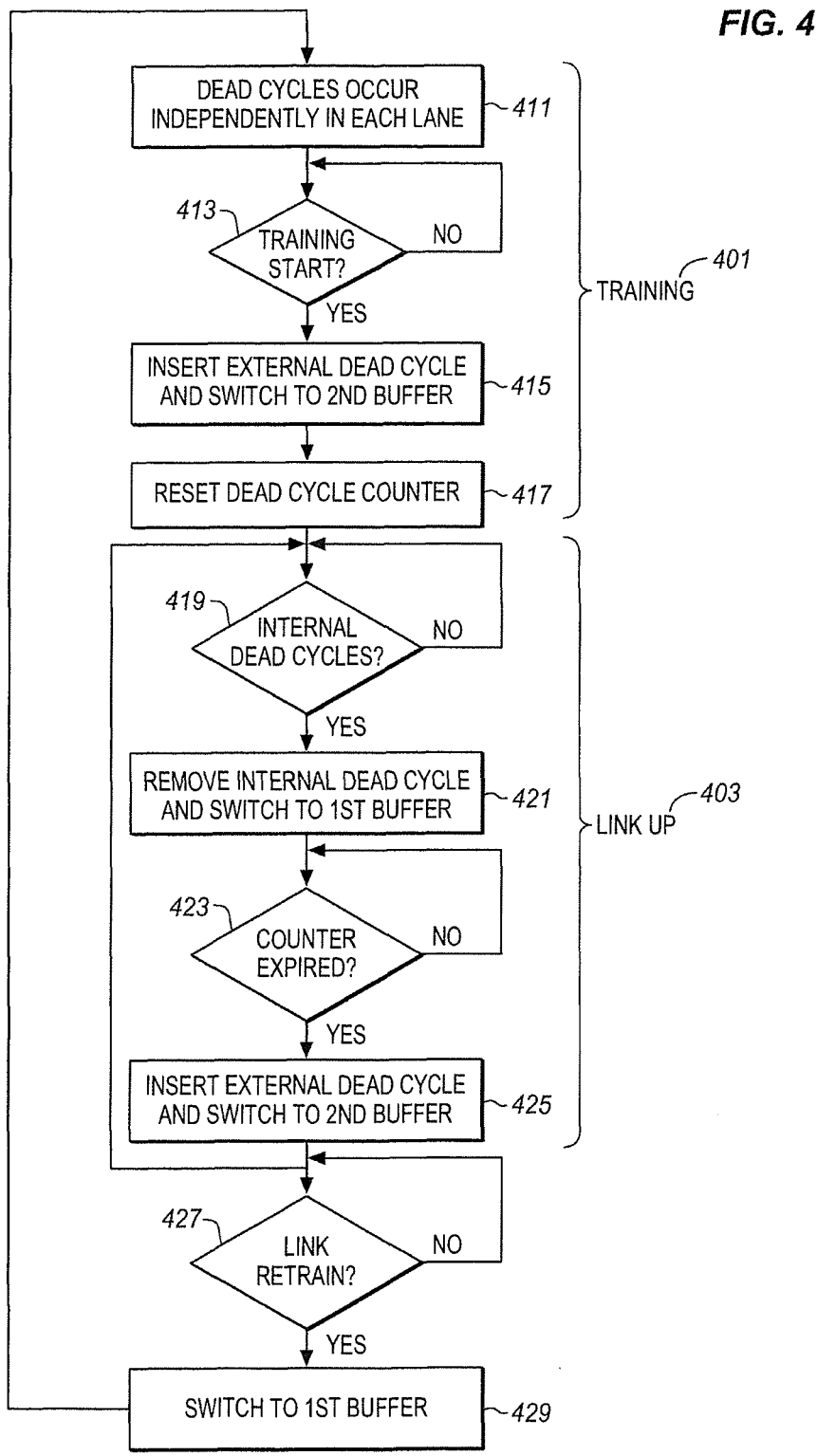
FIG. 4 is a process flow diagram of removing and inserting dead cycles according to an embodiment of the invention.

FIG. 4 shows a simplified process flow diagram of the counter based insertion of dead cycles simultaneously across all lanes as described above. The process has a Training phase 401 and a Link Up phase 403. During the Training phase dead cycles may be inserted into the data in each lane as each lane hits its own data underflow condition. This is indicated at block 411 and the occurrence of dead cycles is independent in each lane. During the Training phase this does not affect the transmission of data.

There is a continuous loop at 427 that runs autonomously to determine if it is time for the link to be retrained. Alternatively, the process may use an interrupt. This transition typically happens if there are errors on the link or some other link failure. It may also be invoked by a hardware change or a software trigger. When a link retrain occurs, then the data link to the output buffer is switched to the first buffer at 429 through the FLOPSET selection signal as shown in FIG. 2B.

At this point, there is typically no data being transferred. Instead idle bits or training bits are sent and these will include dead cycles whenever there is a data underflow. The system then waits for a symbol indicating that the data stream has started at 413, such as the SDSOS mentioned above. This may be associated with the end of the link training cycle. When normal data transfer is to start, an external dead cycle is inserted into the output buffer at 415 across all lanes. The dead cycles are therefore aligned, the link is up and the system is ready to process data block. At this time at 415 the output of the system is also switched from the first buffer to the second buffer.

Because the second buffer is one clock cycle behind the first buffer, switching to the second buffer results in a repeat of the same data in the next clock cycle. This repeated cycle is replaced with a dead cycle and the next cycle is the cycle immediately following the last cycle from the first buffer. The buffer is switched by sending an appropriate control signal to the FLOPSET selector input.

After the dead cycle is inserted the dead cycle counter is reset at 417. As mentioned above the dead cycle counter is a two bit counter in order to accommodate the particular structure of PCIe. For other protocols other counters may be used. The resetting of the counter is followed by the Link Up phase 403. The Link Up phase begins by starting to detect internal dead cycles at 419. This process may be performed continuously until one is detected. At 421, if an internal dead cycle is detected, then the output is switched from the second buffer to the first buffer to remove the dead cycle. This again may be performed by driving a signal to the FLOPSET MUX selector input shown in the context of FIG. 2B.

Because the data in the first buffer is one cycle ahead of the second buffer, switching to the first buffer advances the data by one clock cycle. This would result in the loss of one cycle of data, however, since that cycle is the dead cycle, it contains no data. As a result, the flow of data into the output buffer is maintained without a dead cycle and the internal dead cycle has been eliminated.

The process flow continues until the counter expires at block 423. When the counter expires, an external dead cycle is inserted at 425 and the output switches back to the second buffer. This dead cycle is inserted simultaneously across all lanes in an optimal location as determined by the counter. Because the dead cycle causes a one cycle delay, the output can be switched to the second, delayed buffer with no loss of data. The process then returns to decision block 417 to detect the occurrence of the next internal dead cycle.

As mentioned above, these processes may be interrupted by a new link retraining at any time which takes the process through block 427, 429 and back to 411.

Figure 5:
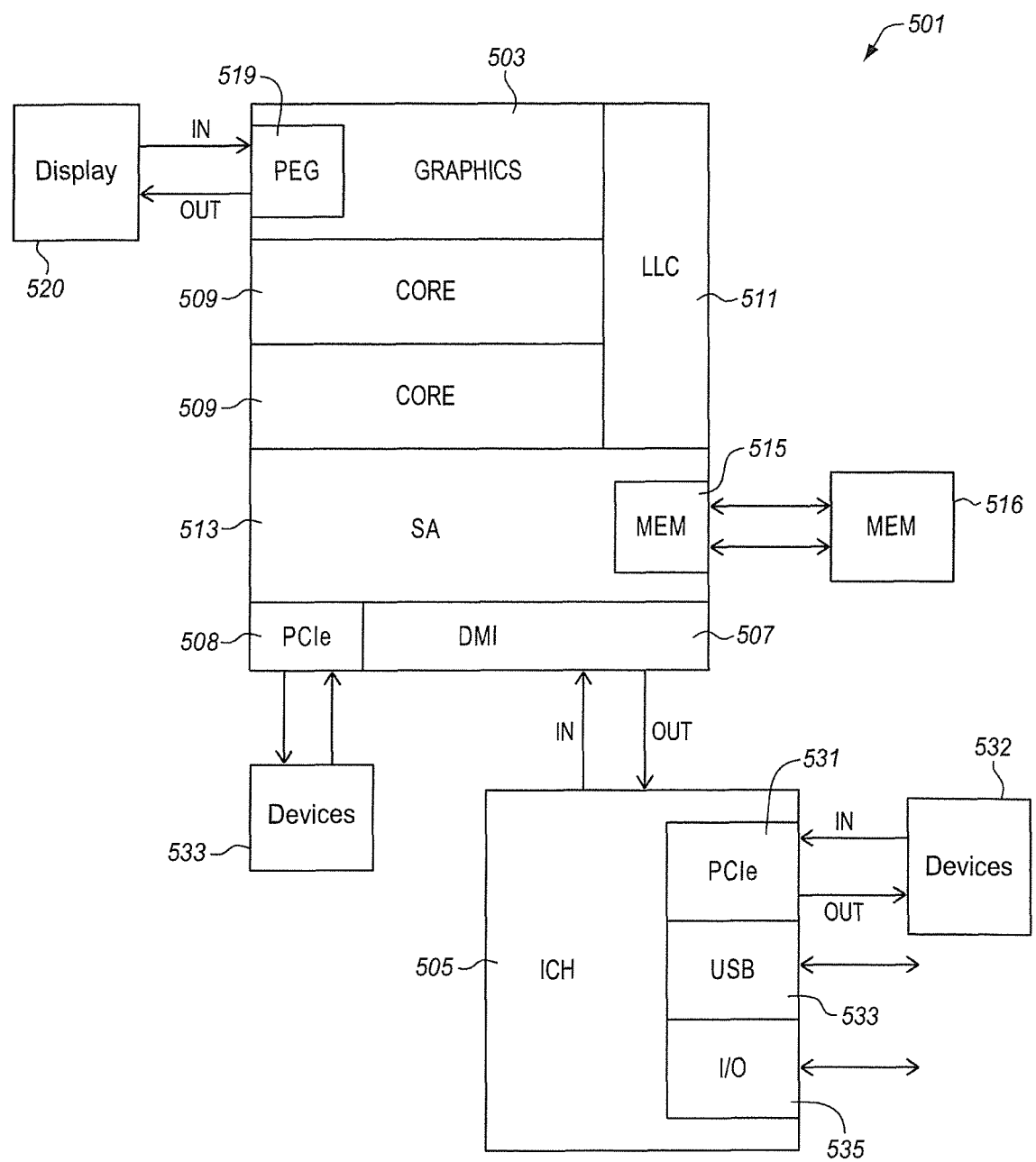
FIG. 5 is a block diagram of a computer system in a test configuration according to an embodiment of the invention.

FIG. 5 is a computer system diagram showing PCIe interfaces and other similar interfaces that may benefit from the techniques and hardware discussed above. A computer system 501 has a CPU 503 coupled to an input/output controller hub (ICH) 505 through a DMI (Direct Media Interface) 507. The CPU has one or more cores for general purpose computing 509 coupled to the graphics core 507 and which share a Last Level Cache 511. The CPU includes system agents 513 such as a memory interface 515, and a PCIe graphics interface 508. In the illustrated example, the PCIe interface is for PCI express graphics and can be coupled to a graphics adapter or to a display 520 through a display engine 519, depending on the implementation. An additional PCIe interface 508 is provided in the CPU to be coupled to other PCIe devices and interfaces 533, such as high speed storage or communications. The memory interface 515 is to be coupled to system memory 516.

The input/output controller hub 505 includes interfaces 531 to additional PCIe devices 533, universal serial bus interfaces 532, and other external peripheral input/output interfaces 535. These interfaces are used for mass storage, displays, and user input/output devices, such as a keyboard and mouse. The input/output controller hub may also include a display interface and other additional interfaces.

The UDRs described above may be integrated into the PCIe interfaces in the CPU or the ICH or in any other desired location. In addition, they may be incorporated into the external devices 520, 533 that carry PCIe interfaces. Various other interfaces are also shown. If these also carry dead cycles within packets, then the approaches described above may also be applied to these interfaces.

A wide range of additional and alternative devices may be coupled to the computer system 501 shown in FIG. 5. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

It is to be appreciated that a lesser or more equipped system than the examples described above may be preferred for certain implementations. Therefore, the configuration of the exemplary systems and circuits may vary from implementation to implementation depending upon numerous factors, such as price constraints, performance requirements, technological improvements, or other circumstances.

Embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
receiving a sequence of bytes into a first buffer from each lane of a multiple lane peripheral device bus, wherein the sequence of bytes combine to form packets, the packets including dead cycles and wherein each byte of the sequence of bytes is received in one of a sequence of clock cycles;
receiving the sequence of bytes also into a second buffer delayed one clock cycle from the first buffer;
providing the sequence of bytes from the first buffer to an output buffer
counting clock cycles of data as the data is received into the first and second buffers;
upon reaching a predetermined count, inserting a dead cycle into the output buffer; and
after inserting the dead cycle providing the sequence of bytes from the second buffer instead of the first buffer to the output buffer.

2. The method of claim 1, wherein inserting a dead cycle comprises inserting a dead cycle into the output buffer across all lanes of the multiple lane peripheral bus simultaneously.

3. The method of claim 2, wherein providing the sequence of bytes from the second buffer comprises providing a next byte in the sequence of bytes from the second buffer after the last byte provided from the first buffer and after one cycle delay, the one cycle delay comprising a dead cycle.

4. The method of claim 1, wherein counting comprises incrementing a two-bit counter.

5. The method of claim 4, further comprising detecting the start of a packet in the received sequence of bytes and resetting the counter upon detecting the start of a packet.

6. The method of claim 5, wherein detecting the start of a packet comprises detecting a Start of Data Stream Ordered Set signal.

7. The method of claim 1, further comprising:
monitoring the sequence of bytes into the first buffer for the presence of a dead cycle in the sequence of bytes during providing the sequence of bytes from the second buffer; and
upon inserting a dead cycle providing the sequence of bytes from the first buffer instead of the second buffer to the output buffer.

8. The method of claim 7, wherein providing the sequence of bytes from the first buffer comprises inserting a next byte from the first buffer without an intervening dead cycle.

9. The method of claim 1, wherein receiving a sequence of bytes comprises receiving two bytes per lane in each clock cycle.

10. A machine-readable nontransitory medium storing instructions which when operated on by the machine cause the machine to perform operations comprising:
receiving a sequence of bytes into a first buffer from each lane of a multiple lane peripheral device bus, wherein the sequence of bytes combine to form packets, the packets including dead cycles and wherein each byte of the sequence of bytes is received in one of a sequence of clock cycles;

receiving the sequence of bytes also into a second buffer delayed one clock cycle from the first buffer;

providing the sequence of bytes from the first buffer to an output buffer counting clock cycles of data as the data is received into the first and second buffers;

upon reaching a predetermined count, inserting a dead cycle into the output buffer; and after inserting the dead cycle providing the sequence of bytes from the second buffer instead of the first buffer to the output buffer.

11. The medium of claim 10, wherein inserting a dead cycle comprises inserting a dead cycle into the output buffer across all lanes of the multiple lane peripheral bus simultaneously.

12. The medium of claim 10, the operations further comprising detecting Start of Data Stream Ordered Set signal in the received sequence of bytes and resetting the counter upon detecting the start of a packet.

13. The medium of claim 10, the operations further comprising:

monitoring the sequence of bytes into the first buffer for the presence of a dead cycle in the sequence of bytes during providing the sequence of bytes from the second buffer; and upon inserting a dead cycle providing the sequence of bytes from the first buffer instead of the second buffer to the output buffer.

14. An apparatus comprising:

a first input buffer to receive a sequence of bytes from each lane of a multiple lane peripheral device bus, wherein the sequence of bytes combine to form packets, the packets including dead cycles and wherein each byte of the sequence of bytes is received in one of a sequence of clock cycles;

a delay stage to delay the sequence of bytes;

a second buffer to also receive the sequence of bytes with a delay from the delay stage;

a multiplexer coupled to the first and second buffers to receive the sequence of bytes from the first and second buffer and send the sequence of bytes from either the first or the second buffer to an output buffer;

a counter to count clock cycles of the input sequence of bytes; and a selector to insert a dead cycle into the sequence of bytes sent to the output buffer and to switch the multiplexer from sending bytes from the first buffer to the second buffer upon the counter reaching a predetermined count.

15. The apparatus of claim 14, wherein the multiplexer is switched so that there is a delay of one clock cycle between sending a last byte from the first buffer and sending a first byte from the second cycle, the delay inserting dead cycle into the output buffer.

16. The apparatus of claim 15, wherein the dead cycle is inserted across all lanes of the multiple lane peripheral bus simultaneously.

17. The apparatus of claim 14, further comprising:

a plurality of physical lane units of the peripheral device interface bus to receive packets from a peripheral device, the lane units each being coupled, in parallel to the delay stage.

18. The apparatus of claim 14, further comprising a signal parser to determine that a signal is a start of a packet and to reset the counter upon detecting the start of a packet.

19. The apparatus of claim 18, wherein the signal parser determines that a signal is a start of a packet by detecting a Start of Data Stream Ordered Set signal.

20. The apparatus of claim 14, further comprising:

a signal parser to determine the occurrence of a dead cycle in the sequence of bytes during providing the sequence of bytes from the second buffer; and wherein the selector, upon the detecting of the dead cycle provides the sequence of bytes from the first buffer instead of the second buffer to the output buffer.

\* \* \* \* \*